US012786558B2

(12) United States Patent
Lokshin et al.

(10) Patent No.: US 12,786,558 B2
(45) **Date of Patent: *Nov. 3, 2026**

(54) SYSTEMS AND METHODS TO CONTROL CAMERA OPERATIONS

(71) Applicant: AlpineReplay, Inc., Huntington Beach, CA (US)

(72) Inventors: David J. Lokshin, Huntington Beach, CA (US); Anatole M. Lokshin, Huntington Beach, CA (US)

(73) Assignee: AlpineReplay, Inc., Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,086

(22) Filed: Jan. 4, 2023

(65) Prior Publication Data

US 2023/0142035 A1 May 11, 2023

Related U.S. Application Data

(63) Continuation of application No. 15/931,473, filed on May 13, 2020, now Pat. No. 11,553,126, which is a continuation of application No. 16/277,596, filed on Feb. 15, 2019, now Pat. No. 10,659,672, which is a (Continued)

(51) Int. Cl.
*H04N 23/66* (2023.01)
*H04N 23/69* (2023.01)

(52) U.S. Cl.
CPC ............ *H04N 23/66* (2023.01); *H04N 23/69* (2023.01)

(58) Field of Classification Search
CPC ............................... H04N 23/66; H04N 23/69
See application file for complete search history.

(56) References Cited

U.S. PATENT DOCUMENTS

| | | | |
|---|---|---|---|
| 4,800,897 | A | 1/1989 | Nilsson |
| 5,067,717 | A | 11/1991 | Harlan et al. |
| 5,337,758 | A | 8/1994 | Moore et al. |

(Continued)

FOREIGN PATENT DOCUMENTS

| | | |
|---|---|---|
| CN | 1308505 | 8/2001 |
| CN | 1533672 | 9/2004 |

(Continued)

OTHER PUBLICATIONS

Chinese Application No. 201380075986.2, Search Report, Mar. 18, 2017.

(Continued)

*Primary Examiner* — Albert H Cutler
(74) *Attorney, Agent, or Firm* — Greenberg Traurig

(57) ABSTRACT

Systems and methods to control operations of a camera based on one or more sensors attached to one or more actors. Sensor data collected from the sensors is analyzed to identify a state of an actor. The state of the actor is used to determine an operation parameter of the camera, such as the zoom level of the camera and/or the direction of the camera, and control the operation of the camera. For example, an actor who is in a state about to perform an interesting action can be selected from a plurality of actors; and the direction and the zoom level of the camera can be adjusted to focus on the selected actor in capture one or more subsequent images.

18 Claims, 3 Drawing Sheets

Related U.S. Application Data continuation of application No. 15/046,144, filed on Feb. 17, 2016, now Pat. No. 10,212,325.

(60) Provisional application No. 62/117,398, filed on Feb. 17, 2015.

(56) References Cited

U.S. PATENT DOCUMENTS

| | | | | |
|---|---|---|---|---|
| 5,724,265 | A | 3/1998 | Hutchings | |
| 5,825,667 | A | 10/1998 | Van Den Broek | |
| 6,013,007 | A | 1/2000 | Root et al. | |
| 6,167,356 | A | 12/2000 | Squadron et al. | |
| 6,436,052 | B1 | 8/2002 | Nikolic et al. | |
| 6,445,882 | B1 | 9/2002 | Hirano | |
| 6,499,000 | B2 | 12/2002 | Flentov et al. | |
| 6,571,193 | B1 | 5/2003 | Unuma et al. | |
| 6,825,777 | B2 | 11/2004 | Vock et al. | |
| 6,963,818 | B2 | 11/2005 | Flentov et al. | |
| 7,451,056 | B2 | 11/2008 | Flentov et al. | |
| 7,602,301 | B1 | 10/2009 | Stirling et al. | |
| 7,640,135 | B2 | 12/2009 | Vock et al. | |
| 7,827,000 | B2 | 11/2010 | Stirling et al. | |
| 7,860,666 | B2 | 12/2010 | Vock et al. | |
| 7,991,565 | B2 | 8/2011 | Vock et al. | |
| 8,055,469 | B2 | 11/2011 | Kulach et al. | |
| 8,239,146 | B2 | 8/2012 | Vock et al. | |
| 8,270,670 | B2 | 9/2012 | Chen et al. | |
| 8,628,453 | B2 | 1/2014 | Balakrishnan et al. | |
| 8,929,709 | B2 | 1/2015 | Lokshin | |
| 9,060,682 | B2 | 6/2015 | Lokshin | |
| 9,326,704 | B2 | 5/2016 | Lokshin et al. | |
| 9,497,407 | B2 | 11/2016 | Lokshin | |
| 9,566,021 | B2 | 2/2017 | Lokshin et al. | |
| 9,769,387 | B1 | 9/2017 | Beard et al. | |
| 10,008,237 | B2 | 6/2018 | Lokshin et al. | |
| 10,212,325 | B2 * | 2/2019 | Lokshin | H04N 23/69 |
| 10,659,672 | B2 | 5/2020 | Lokshin et al. | |
| 11,553,126 | B2 | 1/2023 | Lokshin et al. | |
| 2002/0052541 | A1 | 5/2002 | Cuce et al. | |
| 2002/0115927 | A1 | 8/2002 | Tsukada et al. | |
| 2003/0065257 | A1 | 4/2003 | Mault et al. | |
| 2003/0163287 | A1 | 8/2003 | Vock et al. | |
| 2004/0225467 | A1 | 11/2004 | Vock et al. | |
| 2005/0223799 | A1 | 10/2005 | Murphy | |
| 2005/0243061 | A1 | 11/2005 | Liberty et al. | |
| 2006/0166737 | A1 | 7/2006 | Bentley | |
| 2006/0190419 | A1 | 8/2006 | Bunn et al. | |
| 2006/0247504 | A1 | 11/2006 | Tice | |
| 2006/0291840 | A1 | 12/2006 | Murata et al. | |
| 2007/0027367 | A1 | 2/2007 | Oliver et al. | |
| 2007/0063850 | A1 | 3/2007 | Devaul et al. | |
| 2008/0096726 | A1 | 4/2008 | Riley et al. | |
| 2008/0246841 | A1 | 10/2008 | Chen et al. | |
| 2009/0009605 | A1 | 1/2009 | Ortiz | |
| 2009/0041298 | A1 | 2/2009 | Sandler et al. | |
| 2009/0046152 | A1 | 2/2009 | Aman | |
| 2009/0063097 | A1 | 3/2009 | Vock et al. | |
| 2009/0088204 | A1 | 4/2009 | Culbert et al. | |
| 2009/0210078 | A1 | 8/2009 | Crowley | |
| 2009/0322540 | A1 | 12/2009 | Richardson et al. | |
| 2010/0030482 | A1 | 2/2010 | Li | |
| 2010/0081116 | A1 | 4/2010 | Barasch et al. | |
| 2010/0113115 | A1 | 5/2010 | Hightower | |
| 2010/0120585 | A1 | 5/2010 | Quy | |
| 2010/0149331 | A1 | 6/2010 | DiMare et al. | |
| 2010/0161271 | A1 | 6/2010 | Shah et al. | |
| 2010/0191499 | A1 | 7/2010 | Vock et al. | |
| 2010/0204615 | A1 | 8/2010 | Kyle et al. | |
| 2010/0268459 | A1 | 10/2010 | O'Shea | |
| 2011/0071792 | A1 | 3/2011 | Miner | |
| 2011/0208822 | A1 | 8/2011 | Rathod | |
| 2011/0222766 | A1 | 9/2011 | Kato et al. | |
| 2011/0246122 | A1 | 10/2011 | Iketani et al. | |
| 2011/0270135 | A1 | 11/2011 | Dooley et al. | |
| 2011/0313731 | A1 | 12/2011 | Vock et al. | |
| 2012/0004883 | A1 | 1/2012 | Vock et al. | |
| 2012/0113274 | A1 | 5/2012 | Adhikari et al. | |
| 2012/0130515 | A1 | 5/2012 | Homsi et al. | |
| 2012/0154557 | A1 | 6/2012 | Perez et al. | |
| 2012/0178534 | A1 | 7/2012 | Ferguson et al. | |
| 2012/0191705 | A1 | 7/2012 | Tong et al. | |
| 2012/0251079 | A1 | 10/2012 | Meschter et al. | |
| 2013/0044043 | A1 | 2/2013 | Abdollahi et al. | |
| 2013/0162852 | A1 * | 6/2013 | Boyle | H04N 23/6812 348/211.99 |
| 2013/0176401 | A1 | 7/2013 | Monari et al. | |
| 2013/0188067 | A1 | 7/2013 | Koivukangas et al. | |
| 2013/0218504 | A1 | 8/2013 | Fall et al. | |
| 2013/0242105 | A1 * | 9/2013 | Boyle | H04N 23/90 348/157 |
| 2013/0265440 | A1 | 10/2013 | Mizuta | |
| 2013/0274040 | A1 | 10/2013 | Coza et al. | |
| 2013/0278727 | A1 | 10/2013 | Tamir et al. | |
| 2013/0316840 | A1 | 11/2013 | Marks | |
| 2013/0330054 | A1 | 12/2013 | Lokshin | |
| 2013/0346013 | A1 | 12/2013 | Lokshin et al. | |
| 2014/0028855 | A1 | 1/2014 | Pryor | |
| 2014/0120838 | A1 | 5/2014 | Lokshin | |
| 2014/0257743 | A1 | 9/2014 | Lokshin et al. | |
| 2014/0257744 | A1 | 9/2014 | Lokshin et al. | |
| 2014/0287389 | A1 | 9/2014 | Kallmann et al. | |
| 2015/0050972 | A1 | 2/2015 | Sarrafzadeh et al. | |
| 2015/0098688 | A1 | 4/2015 | Lokshin | |
| 2015/0154452 | A1 | 6/2015 | Bentley et al. | |
| 2015/0335949 | A1 | 11/2015 | Lokshin et al. | |
| 2015/0340066 | A1 | 11/2015 | Lokshin et al. | |
| 2016/0006974 | A1 | 1/2016 | Pulkkinen et al. | |
| 2016/0042493 | A1 | 2/2016 | Macmillan et al. | |
| 2016/0042622 | A1 | 2/2016 | Takiguchi et al. | |
| 2016/0045785 | A1 | 2/2016 | Tzovanis et al. | |
| 2016/0050360 | A1 | 2/2016 | Fisher et al. | |
| 2016/0225410 | A1 * | 8/2016 | Lee | H04N 21/21805 |
| 2016/0241768 | A1 | 8/2016 | Lokshin et al. | |
| 2017/0026608 | A1 | 1/2017 | Lokshin | |
| 2017/0106238 | A1 | 4/2017 | Lokshin et al. | |
| 2019/0182417 | A1 | 6/2019 | Lokshin et al. | |
| 2020/0275008 | A1 | 8/2020 | Lokshin et al. | |

FOREIGN PATENT DOCUMENTS

| | | |
|---|---|---|
| CN | 1907222 | 2/2007 |
| CN | 102198317 | 9/2011 |
| EP | 0866949 | 9/1998 |
| JP | 2001317959 | 11/2001 |
| JP | 2003244691 | 8/2003 |
| JP | 2005286377 | 10/2005 |
| JP | 2005286394 | 10/2005 |
| JP | 2006345270 | 12/2006 |
| JP | 2009065324 | 3/2009 |
| JP | 2009078134 | 4/2009 |
| JP | 2010088886 | 4/2010 |
| JP | 2012008683 | 1/2012 |
| JP | 2012512608 | 5/2012 |
| JP | 2012523900 | 10/2012 |
| JP | 2013130808 | 7/2013 |
| WO | 2006081395 | 8/2006 |
| WO | 2007006346 | 1/2007 |
| WO | 2010025467 | 3/2010 |
| WO | 2011069291 | 6/2011 |
| WO | 2011101858 | 8/2011 |
| WO | 2011140095 | 10/2011 |
| WO | 2012027626 | 3/2012 |
| WO | 2014073454 | 5/2014 |

OTHER PUBLICATIONS

Chinese Patent Application No. 201380020481.6, Search Report, Apr. 25, 2017.

European Patent Application No. 12886942.7, Extended Search Report, Sep. 22, 2015.

European Patent Application No. 13877362.7, Supplementary Search Report, Sep. 29, 2016.

(56) References Cited

OTHER PUBLICATIONS

European Patent Application No. 13876901.3, European Search Report, Mar. 2, 2017.
International Patent Application PCT/US2012/071867, International Search Report and Written Opinion, Jul. 4, 2013.
International Patent Application PCT/US2012/071869, International Search Report and Written Opinion, Apr. 29, 2013.
International Patent Application PCT/US2013/021122, International Search Report and Written Opinion, Apr. 23, 2013.
International Patent Application PCT/US2013/059410, International Search Report and Written Opinion, Dec. 9, 2013.
International Patent Application PCT/US2013/058807, International Search Report and Written Opinion, Dec. 30, 2013.
International Patent Application PCT/US2015/047251, International Search Report and Written Opinion, Dec. 16, 2015.
International Patent Application No. PCT/US2016/018291, International Search Report and Written Opinion, Apr. 26, 2016.
The Extended European Search Report 13804492.0, Nov. 20, 2015.

* cited by examiner

SYSTEMS AND METHODS TO CONTROL CAMERA OPERATIONS

RELATED APPLICATIONS

The present application is a continuation application of U.S. patent application Ser. No. 15/931,473, filed May 13, 2020 and issued as U.S. Pat. No. 11,553,126 on Jan. 10, 2023, which is a continuation application of U.S. patent application Ser. No. 16/277,596, filed Feb. 15, 2019 and issued as U.S. Pat. No. 10,659,672 on May 19, 2020, which is a continuation application of U.S. patent application Ser. No. 15/046,144, filed Feb. 17, 2016 and issued as U.S. Pat. No. 10,212,325 on Feb. 19, 2019, which claims the benefit of the filing date of Prov. U.S. Pat. App. Ser. No. 62/117,398, filed Feb. 17, 2015 and entitled "Predictive Camera Targeting," the entire disclosures of which applications are hereby incorporated in their entirety by reference.

FIELD OF THE TECHNOLOGY

At least some embodiments disclosed herein relate to the control of cameras in general and more specifically but not limited to autonomous control of camera operations during the capture of still and/or video images.

BACKGROUND

Sensor data can be used to determine the motion characteristics of sporting actions, performances of athletes, and/or states of the participants of sporting activities.

U.S. Pat. App. Pub. No. 2013/0346013, entitled "Method and Apparatus for Determining Sportsman Jumps using Fuzzy Logic," discloses a technique that uses fuzzy logic in the analysis of accelerometer data, generated in response to the motions of a sportsperson, to identify a subset of the data as representing a jump and thus separate the jump from other motions of the sportsperson.

U.S. Pat. No. 8,929,709, entitled "Automatic Digital Curation and Tagging of Action Videos," discloses a system for automatic digital curation, annotation, and tagging of action videos, where sensor data from a device carried by a sportsperson during a sporting activity is used to identify a sportsperson event which is then stored in a performance database to automatically select, annotate, tag or edit corresponding video data of the sporting activity.

U.S. Pat. No. 9,060,682, entitled "Distributed Systems and Methods to Measure and Process Sport Motions," discloses a distributed, multi-stage, intelligent system configured to determine action performance characteristics parameters in action sports.

U.S. Pat. App. Pub. No. 2014/0257743, entitled "Systems and Methods for Identifying and Characterizing Athletic Maneuvers," discloses techniques to automatically identify athletic maneuvers by determining, from sensor data, motion characteristics and then based on the motion characteristics, an athletic maneuver.

U.S. Pat. App. Pub. No. 2014/0257744, entitled "Systems and Methods for Synchronized Display of Athletic Maneuvers," discloses techniques to synchronize the video streams of different sportspersons based on synchronizing the occurrences of motion characteristics identified from sensor data such that the athletic maneuvers of the sportspersons can be visually compared side by side.

U.S. Pat. App. Pub. No. 2015/0335949, entitled "Use of Gyro Sensors for Identifying Athletic Maneuvers," discloses techniques to use at least one gyroscopic sensor in identify athletic maneuvers performed by sportspersons.

U.S. Pat. App. Pub. No. 2015/0340066, entitled "Systems and Methods for Creating and Enhancing Videos," discloses the use of sensor data to identify motion characteristics of sports video in combining video selected from multiple video sources to provide a unique and rich viewing experience.

The entire disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Sport events in general, and action sport events in particular, are very popular with their fans and viewing audiences. Such sport events as NFL games, X-Games, Dew Tour, World Surfing Tour, Formula One, etc., attract thousands of fans and real time spectators.

Many of these fans have the capability, skills, and desire to film these events or parts of the events using their smart phones or point-of-view (POV) cameras. This richness of possible video sources is further increased with the introduction of video drones and intelligent cameras.

Very often a single camera is used to record activity of multiple athletes. For example, multiple surfers or kite surfers could surf at the same location, or several snowboarders can follow the same course within a short time interval.

Under such scenarios, a camera operator has a choice to use a general wide angle shot that covers multiple players for the entire duration of the event, or use a zoom view for individual players which excludes other players from the view.

A zoom view is preferable when an athlete is performing a special activity, such as catching a wave during surfing, making a jump, etc. However, to use the zoom view effectively, the operator needs to know when each athlete is going to perform a special event, jump, catching wave, etc. While a human operator of a camera can usually predict such events, such prediction during autonomous operation is often very difficult.

At least some embodiments disclosed herein address these and other issues with solutions that allow autonomous camera tracking of an event, along with the automatic selection of an optimal zoom level and event.

In exemplary embodiments disclosed herein, each athlete has one or more data collection device that is mounted on the body, clothing, and/or equipment of the athlete to measure data related to the activity of the athlete. Such measurements can be performed using any number and type of data collection devices, including a GPS device, an inertial sensor, a magnetic sensor, a pressure sensor, and/or other devices.

Figure 1:
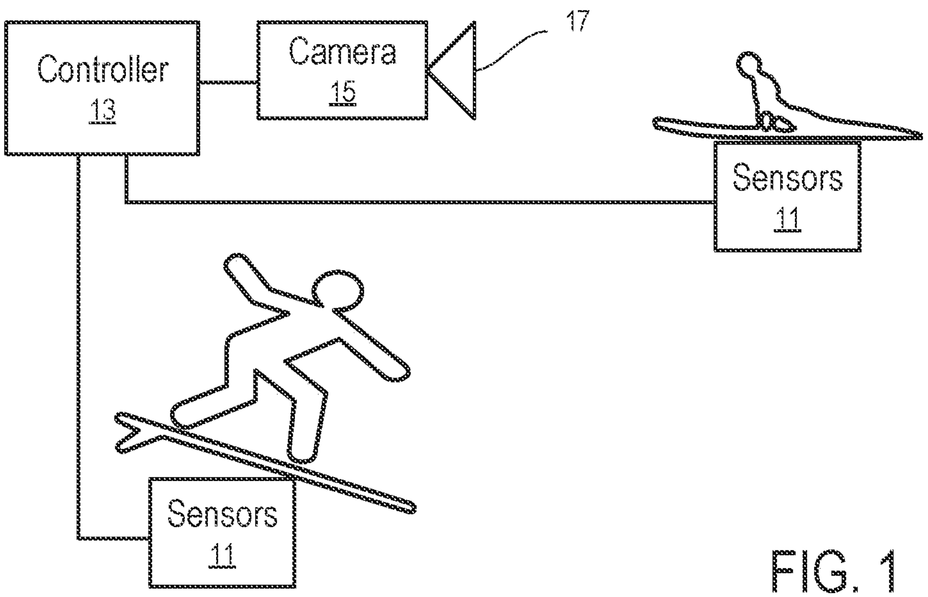
FIG. 1 shows a system configured to control the operations of a camera according to one embodiment.

FIG. 1 shows a system configured to control the operations of a camera according to one embodiment.

In FIG. 1, one or more data collection devices containing the sensors (11) are coupled to a processing unit that is configured to process sensory information from the data collection devices and transmit, via a communication link, processed sensory information to a camera controller (13) to control a respective camera (15).

The processing unit can be integrated with the sensors (11) within the same device housing of the sensors (11), or a separate device that is in communication with one or more sensor devices (e.g., via a wireless personal area network, a wireless local area network, a wired connection). For example, the distributed, multi-stage system to process sensor data as disclosed in U.S. Pat. No. 9,060,682 can be used to process the sensor data generated from the sensors (11) that are attached to the body, clothing, and/or equipment of the athlete, the disclosure of which patent is hereby incorporated herein by reference.

The processing unit can be co-located with the data collection devices containing the sensors (e.g., coupled to the athlete, the athlete's clothing, and/or the athlete's equipment), or be located remotely from the data collection devices. The data collection devices may provide the sensor data to the processing unit via any suitable combination of wired or wireless communication method.

While a single camera controller controlling a single camera is shown receiving data collected from sensors coupled to two different athletes in FIG. 1, data from any number of different athletes, each with their own respective set of data collection devices and processing units, can be transmitted to one or more different camera controllers, where each of the camera controllers can be configured to control any suitable number and type of cameras.

In FIG. 1, based on the analysis of the sensor data received from the sensors (11) configured in the data collection devices, the processing unit and/or the controller (13) can identify one or more "states" for the athlete. Such states may include, for example, a description of a particular athletic maneuver performed by the athlete (e.g., "paddling"), a description of an activity performed by the athlete (e.g., "acceleration before Jump"), as well as other information regarding the athlete.

For example, different states of an athlete engaging in a predetermined sport have different patterns in sensor data (e.g., action performance characteristics parameters, motion characteristics). Thus, by identifying the patterns in the current sensor data of a particular athlete, the controller (13) is configured to automatically identify the current state of the athlete and/or predict the subsequent state of the athlete.

In various embodiments, the states of multiple actors are analyzed by a camera controller (13) to select an actor of interest (e.g., athlete, sportsperson, participant) and focus the camera(s) on the selected actor by directing the camera at the selected actor with a selected camera zoom level.

For example, the controller (13) of one embodiment is configured to adjust the direction of the camera (15). Based on a location sensor attached to the sportsperson to measure the location of the sportsperson and a location sensor attached to the camera, the controller (13) of one embodiment is configured to compute a desired direction of the camera (15) and adjust the camera (15) to the desired direction. Alternatively or in combination, the controller (13) uses image recognition techniques to search, in a captured wide scene, the selected actor that has a predetermined visual characteristic and direct the camera to the location of the selected actor.

For example, the controller (13) of one embodiment is configured to control the optical zoom level of a lens (17) of the camera (15) to capture a scene limited to the selected actor and thus exclude other non-selected actors. In general, the zoom level of the camera can be adjusted via a combination of an optical zoom function of the camera (15) and a digital zoom function.

When no actors are selected (e.g., for being important or of interest) at the moment, the controller (13) instructs the camera (15) to use a general pan wide angle view to capture a broader scene than a narrow scene that focuses on one or more selected actors.

In one embodiment, the processing unit may analyze information about a camera controller (e.g., received from the camera controller (13) itself) to identify a target actor and zoom level to utilize, and then instruct the camera controller accordingly.

In other embodiments, the camera controller (13) receives the state information for multiple actors from the processing units associated with each actor; and the camera controller (13) makes the decision as to which actor should be focused on and at what zoom level.

In yet other embodiments, decisions regarding which actors to be focused on and the appropriate zoom levels to be used are determined by a third-party server or other computing device in communication with both the data processing unit(s) and the camera controller(s).

Figure 2:
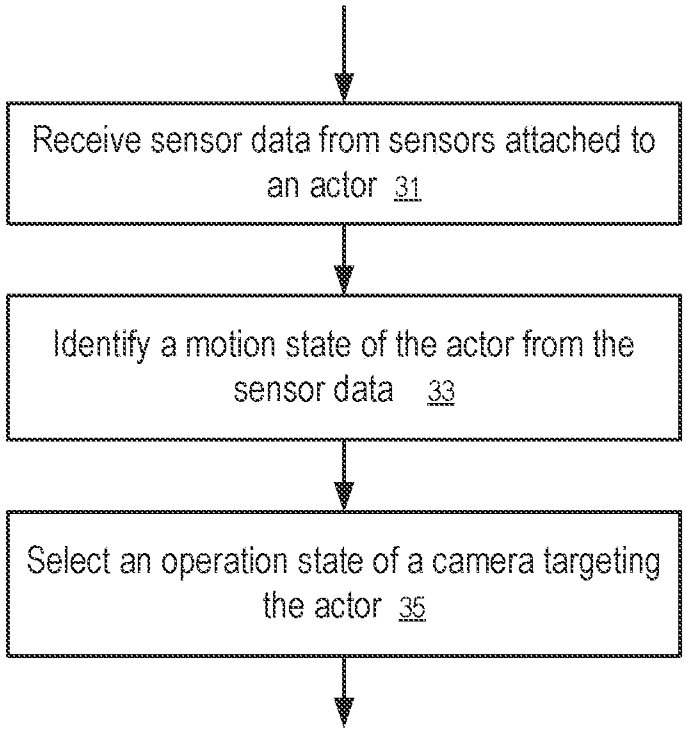
FIG. 2 shows a method to control the operations of a camera according to one embodiment.

FIG. 2 shows a method to control the operations of a camera according to one embodiment. For example, the method of FIG. 2 can be performed in the system illustrated in FIG. 1.

In FIG. 2, a computing apparatus is configured to: receive (31) sensor data from sensors (11) attached to an actor; identify (33) a motion state of the actor from the sensor data; and select (35) an operation state of a camera targeting the actor.

For example, from the current sensor data, the computing apparatus predicts that the actor is about to perform an action of interest and thus directs the camera to zoom in on the actor and/or direct the camera to place the actor at a predetermined location in a scene captured by the camera.

Figure 3:
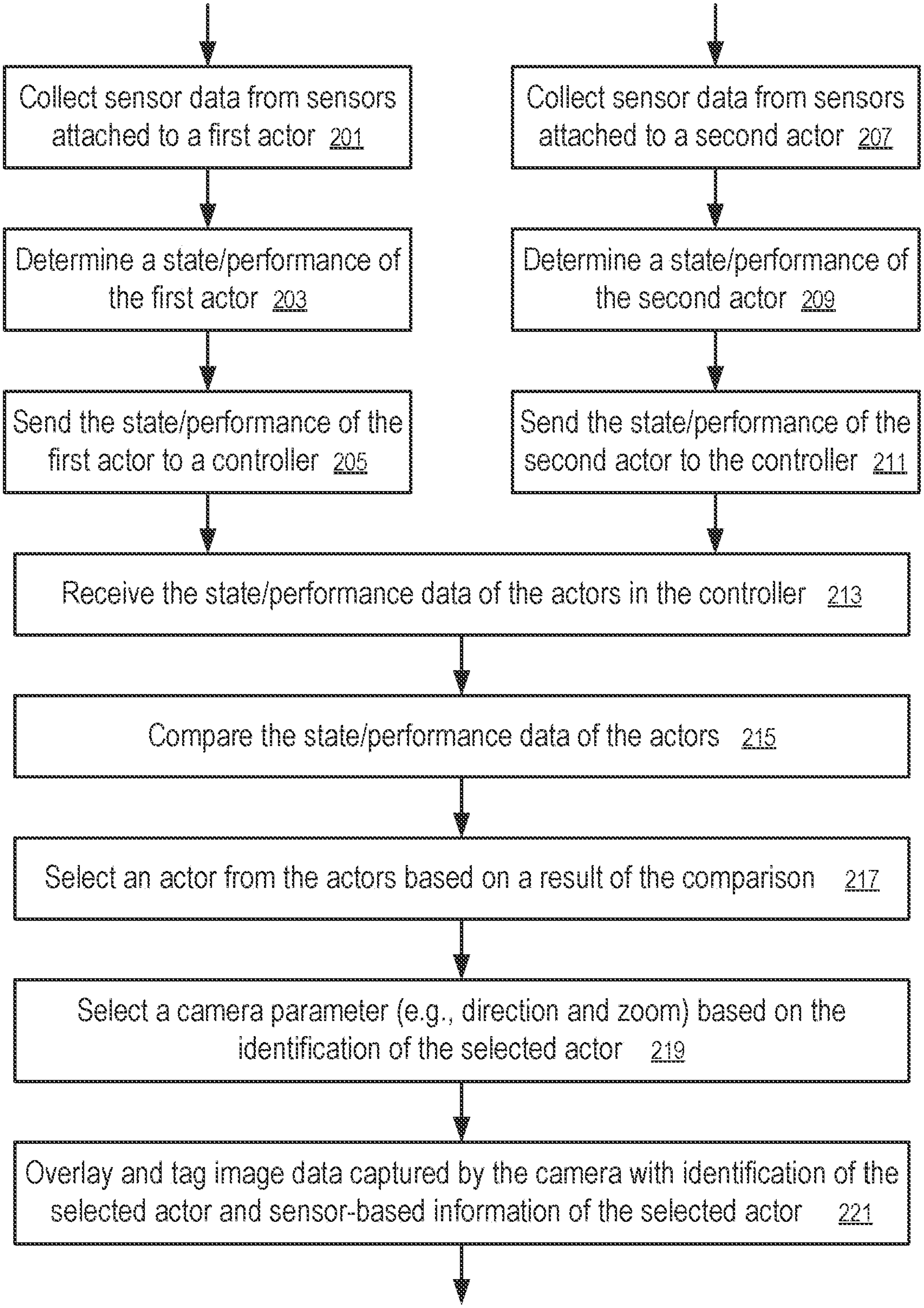
FIG. 3 shows a method to capture video images according to one embodiment.

FIG. 3 shows a method to capture video images according to one embodiment. For example, the method of FIG. 3 can be implemented in a system illustrated in FIG. 1.

In FIG. 3, multiple processing units are used to determine the state and/or performance data of multiple actors. Each respective actor has a corresponding processing unit that processes the sensor data collected from the sensors (11) attached to the respective actor.

For example, a first processing unit is configured to: collect (201) sensor data from sensors (11) attached to a first actor; determine (203) a state/performance of the first actor; and send (205) the state/performance of the first actor to a controller (13).

Similarly, a second processing unit is configured to: collect (207) sensor data from sensors (11) attached to a second actor; determine (209) a state/performance of the second actor; and send (211) the state/performance of the second actor to the controller (13).

The controller (13) is configured to: receive (213) the state/performance data of the actors; compare (215) the state/performance data of the actors; select (217) an actor from the actors based on a result of the comparison; select (219) a camera parameter (e.g., direction and zoom) based on the identification of the selected actor; and overlay (221) and tag image data captured by the camera (15) with identification of the selected actor and sensor-based information of the selected actor.

After the camera (15) captures video segments according to the directions and zoom levels determined according to any embodiment disclosed herein, the video segments captured by the cameras (15) can be enhanced by overlaying information on the segments. Such information may include, for example, the name, date, time, location, and performance characteristics of the athlete. The tagged video segments may be stored in a database, and retrieved using any of the types of information used in tagging the video. For example, the video tagging method disclosed in U.S. Pat. No. 8,929,709 can be used, the disclosure of which patent is hereby incorporated herein by reference.

Thus, among other things, embodiments of the present disclosure help provide the autonomous control of unattended cameras (such as drones or stationary cameras) that cover multiple athletes, and thereby provide optimal video coverage with limited video resources.

In one embodiment, each respective actor of a set of actors in a scene has one or more sensors in communication with a respective processing unit among the plurality of processing units; and the respective processing unit is configured to process sensor data from the one or more sensors to identify a state of the respective actor.

A system of one embodiment includes: a plurality of processing units associated with a plurality of actors participating in an activity; at least one interface to communicate with the processing units, receive from the processing units data identifying states of the actors determined from sensors attached to the actors, and communicate with a camera; at least one microprocessor; and a memory storing instructions configured to instruct the at least one microprocessor to adjust, via the at least one interface, an operation parameter of the camera, based on the data identifying the states of the actors, such as a zoom level of the camera, and a direction of the camera.

The instructions of one embodiment are further configured to instruct the at least one microprocessor to identify an actor of focus from the plurality of actors based on the states of the actors. For example, the actor of focus is selected based at least in part on performances of the plurality of actors measured using the sensors attached to the actors. For example, the actor of focus is selected based at least in part on a prediction, based on the states of the actors, that the actor of focus is about to perform an action of interest.

A method implemented in a computing device of one embodiment includes: receiving, by the computing device, sensor data from one or more sensors attached to an actor; determining, by the computing device, a state of the actor based on the sensor data received from the one or more sensors; and controlling a camera based on the state of the actor determined based on the sensor data.

For example, the controlling of the camera includes: determining an operation parameter of the camera; and adjusting the camera based on the operation parameter. For example, the operation parameter is a zoom level of the camera, or a direction of the camera.

In one embodiment, states of multiple actors are determined based on the sensor data from respective sensors attached to the actors. The states of the actors are compared to select an operation parameter for the camera, such as the camera direction and/or the camera zoom level. For example, the operation parameter can be selected to increase a percentage of an image of a first actor within an image captured by the camera, and/or to reduce (or eliminate) a percentage of an image of the second actor within the image captured by the camera. The desired operation parameter can be computed based on a location of the actor selected as the focus of the camera.

In one embodiment, the one or more sensors are attached to a piece of athletic equipment of the actor. Examples of the one or more sensors include: a GPS device, an inertial sensor, a magnetic sensor, and a pressure sensor.

In one embodiment, the computing device causes the camera to capture one or more images based on the controlling of the direction and/or zoom level of the camera, overlays data derived from the sensor data on the one or more images, tags the one or more images with information derived from the sensor data, and/or store the tagged images in a database, where the tagged images are retrievable via the tagged information.

The present disclosure includes methods performed by the computing device, non-transitory computer-readable media storing instructions that, when executed by such a computing device, cause the computing device to perform such methods, and computing devices configured to perform such methods.

Figure 4:
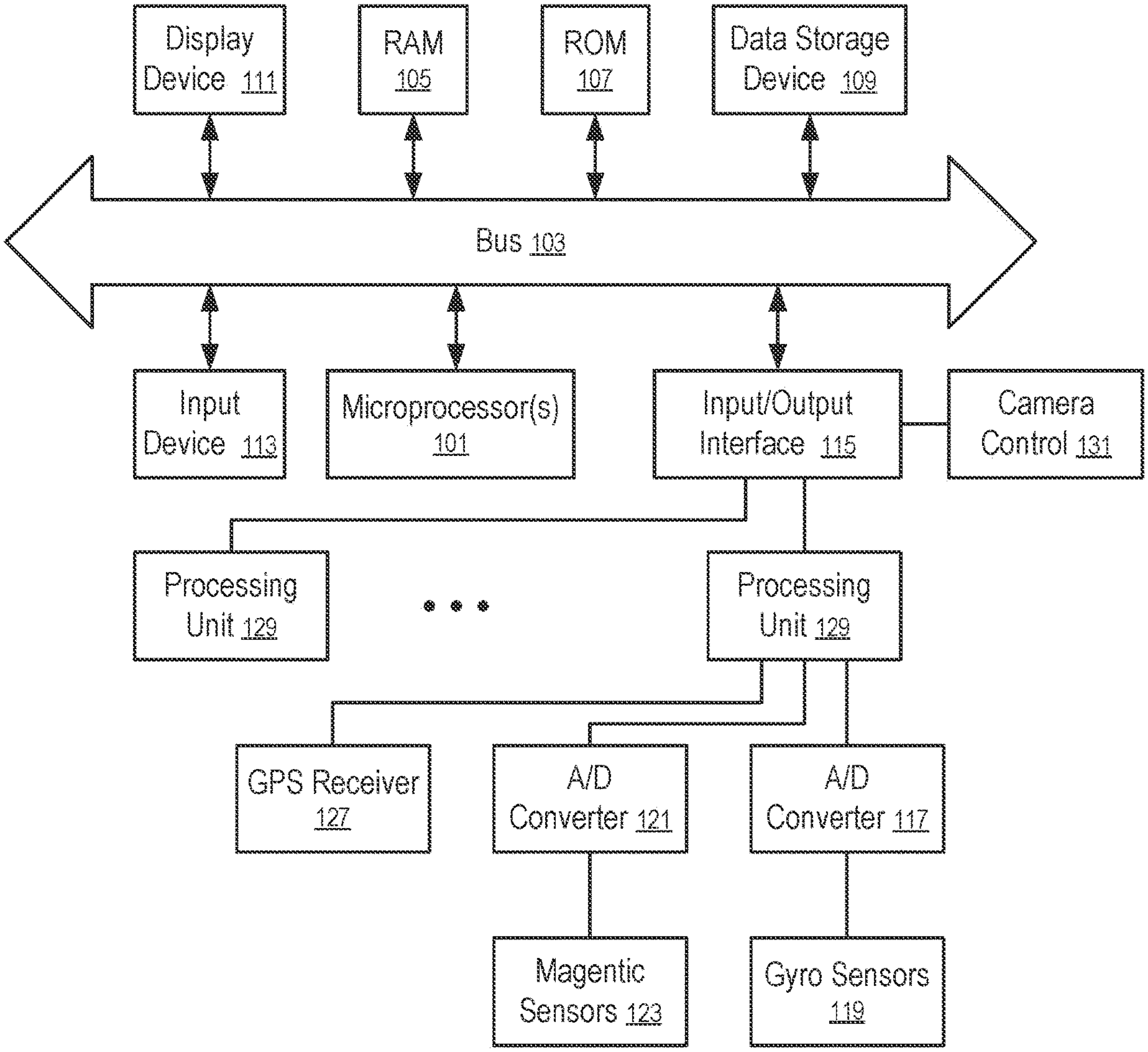
FIG. 4 shows a computing apparatus to control the operations of a camera according to one embodiment.

FIG. 4 shows a computing apparatus to control the operations of a camera according to one embodiment. For example, the computing apparatus of FIG. 4 can be used to implement the method of FIG. 2 or FIG. 3.

In FIG. 4, the computing apparatus includes a plurality of processing units (129) coupled with an input/output interface (115) via one or more communication connections. The processing units (129) are configured to determine the state/performance of the actors in a scene based on the sensor data collected by the sensors attached to the respective actors in the scene.

For example, a set of gyro sensors (119) attached to an actor are configured to measure the angular velocities of a gyro along a plurality of axes. An analog to digital (A/D) converter (117) converts the analog signals from the gyro sensors (119) into digital signals for the input/output interface (115) of a computing device that performs the bias calibration. A global positioning system (GPS) receiver (127) is configured to measure the current location of the actor; and a magnetometer having magnetic sensors (123) with a corresponding A/D converter (121), and/or an accelerometer (not shown in FIG. 4) are used to collect further sensor data related to the state, motion and/or performance of the actor.

In FIG. 4, the computing apparatus is configured with the input/output interface (115) to receive the communications from the processing units (129) associated with the actors and select the camera control (131) based on the state, motion, maneuver, and/or performance of the actors.

The computing device further includes a bus (103) that connects the input/output interface (115), at least one microprocessor (101), random access memory (105), read only memory (ROM) (107), a data storage device (109), a display device (111), and an input device (113).

The memory devices (e.g., 105, 107, and 109) store instructions; and the microprocessor(s) (101) is (are) configured via the instructions to perform various operations disclosed herein to determine the camera control (131) and/or process the camera data.

The computing device of one embodiment is configured to store at least a portion of the processed sensor data (e.g., location, state, motion, maneuver and/or performance of the actors).

In FIG. 4, the display device (111) and the input device (113) are optionally configured via the instructions to provide a user interface that allows the user to view the camera control (131) and/or video images from the cameras (e.g., 17 in FIG. 1). In one embodiment, the user interface is configured to present the sensor data and/or the processing results of the sensor data that allows a human operator to select an actor of focus and/or one or more operating parameters of the camera (17).

FIG. 4 illustrates a data processing system according to one embodiment. While FIG. 4 illustrates various components of a computing apparatus, it is not intended to limit the disclosure to any particular architecture or manner of interconnecting the components. One embodiment may use other systems that have fewer or more components than those shown in FIG. 4.

In general, the memory devices (e.g., 105, 107, and 109) of the computing apparatus includes one or more of: ROM (Read Only Memory) (107), volatile RAM (Random Access Memory) (105), and non-volatile memory (109), such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

At least some of the functions and operations described herein are performed a microprocessor executing instructions stored in the memory devices (e.g., 105, 107, and 109).

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The entire disclosures of the patent documents discussed above are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
- a camera;
- a plurality of processing units configured to be associated respectively with a plurality of actors participating in an activity, wherein one or more sensors are attached to each respective actor among the plurality of actors to generate sensor data during the activity and are configured to communicate the sensor data to a respective processing unit among the plurality of processing units, wherein the respective processing unit is configured to receive the sensor data from the one or more sensors attached to the respective actor;
- at least one interface coupled with the camera and configured to communicate with the processing units and to communicate with the camera;
- at least one microprocessor; and
- a memory storing instructions, wherein when executed by the at least one microprocessor, the instructions cause the at least one microprocessor to:
  - determine, based on the sensor data received from the respective processing unit, a current state of the respective actor during generation of the sensor data;
  - predict a subsequent state of the respective actor during a recording time period following the generation of the sensor data, the subsequent state is predicted before the recording time period;
  - identify, for the recording time period, an actor of focus from the plurality of actors based on states of the actors, including the subsequent state predicted based on the sensor data for the respective actor; and
  - adjust, via the at least one interface, an operation parameter of the camera for the recording time period, based on identification of the actor of focus selected from the plurality of actors.

2. The system of claim 1, wherein the operation parameter is one of: a zoom level of the camera, and a direction of the camera.

3. The system of claim 1, wherein the actor of focus is selected based at least in part on performances of the plurality of actors measured using the sensors attached to the actors.

4. The system of claim 1, wherein the actor of focus is selected based at least in part on a prediction, based on the states of the actors, that the actor of focus is about to perform an action of interest.

5. A method, comprising:
- receiving, by a computing device having a camera not attached to an actor, sensor data from one or more sensors attached to the actor among a plurality of actors having attached sensors in communications with the computing device;
- predicting, by the computing device, a state of the actor that is about to occur, among the plurality of actors, based on the sensor data received from the one or more sensors attached to the actor, wherein the state includes a description of a particular athletic maneuver; and
- controlling the camera based on the state of the actor predicted based on the sensor data, including:
  - determining an operation parameter of the camera based on the state predicted based on the sensor data; and
  - adjusting the camera, to focus on the actor among the plurality of actors, based on the operation parameter.

6. The method of claim 5, wherein the operation parameter includes a zoom level of the camera.

7. The method of claim 5, wherein the operation parameter includes a direction of the camera.

8. The method of claim 5, wherein the actor is a first actor; and the method further comprises:
- receiving, by the computing device, second sensor data from one or more sensors attached to a second actor;
- determining, by the computing device, a state of the second actor based on the second sensor data;
- comparing the state of the first actor and the state of the second actor; and
- selecting an operation parameter for the camera based on the comparing of the state of the first actor and the state of the second actor.

9. The method of claim 5, wherein the actor is a first actor; and the method further comprises selecting of the operation parameter including:
- selecting the first actor from a plurality of actors including the first actor and a second actor, based on comparing a state of the first actor and a state of the second actor; and
- determining the operation parameter based on an identification of the first actor selected based on the comparing.

10. The method of claim 9, wherein the operation parameter is selected to increase a percentage of an image of the first actor within an image captured by the camera.

11. The method of claim 10, wherein the operation parameter is selected to reduce a percentage of an image of the second actor within the image captured by the camera.

12. The method of claim 9, wherein the operation parameter is selected based on a location of the first actor.

13. The method of claim 5, wherein the one or more sensors attached to the actor are attached to a piece of athletic equipment of the actor.

14. The method of claim 5, wherein the one or more sensors attached to the actor include at least one of: a GPS device, an inertial sensor, a magnetic sensor, and a pressure sensor.

15. The method of claim 5, further comprising:

causing the camera to capture one or more images based on the controlling of the camera.

16. The method of claim 15, further comprising:

overlaying data derived from the sensor data on the one or more images.

17. The method of claim 15, further comprising:

tagging the one or more images with information derived from the sensor data; and storing the one or more images as tagged with the information in a database, wherein the one or more images are retrievable from the database via the information.

18. A non-transitory computer-readable medium storing instructions that, when executed by a computing device, cause the computing device to perform a method, the method comprising:

receiving, by the computing device having a camera not attached to an actor, sensor data from one or more sensors attached to the actor among a plurality of actors having attached sensors in communications with the computing device;

predicting, by the computing device, a description of a particular athletic maneuver of the actor that is about to occur, among the plurality of actors, based on the sensor data received from the one or more sensors attached to the actor; and controlling the camera based on the description of the particular athletic maneuver of the actor predicted based on the sensor data, including:

determining an operation parameter of the camera based on the description predicted based on the sensor data; and adjusting the camera, to focus on the actor among the plurality of actors, based on the operation parameter.

* * * * *